(12) United States Patent
Sakamoto (10) Patent No.: US 10,193,252 B2
(45) Date of Patent: Jan. 29, 2019

(54) ELECTRONIC COMPONENT AND IMAGING DEVICE

(71) Applicant: IRISO ELECTRONICS CO., LTD., Kanagawa (JP)

(72) Inventor: Tetsuma Sakamoto, Kanagawa (JP)

(73) Assignee: IRISO ELECTRONICS CO., LTD., Kanagawa (JP)

( * ) Notice: Subject to any disclaimer, the term of this patent is extended or adjusted under 35 U.S.C. 154(b) by 0 days.

(21) Appl. No.: 15/843,586

(22) Filed: Dec. 15, 2017

(65) Prior Publication Data

US 2018/0183162 A1 Jun. 28, 2018

(30) Foreign Application Priority Data

Dec. 28, 2016 (JP) ................................. 2016-255968

(51) Int. Cl.
*H01R 12/00* (2006.01)
*H01R 12/71* (2011.01)
*H01R 12/70* (2011.01)
*H04N 5/225* (2006.01)
*H01R 13/08* (2006.01)

(52) U.S. Cl.
CPC ....... *H01R 12/716* (2013.01); *H01R 12/7076* (2013.01); *H01R 13/08* (2013.01); *H04N 5/2252* (2013.01); *H04N 5/2257* (2013.01); *H01R 2201/26* (2013.01)

(58) Field of Classification Search
CPC .............. H01R 12/7076; H01R 13/08; H01R 2201/26; H01R 12/716; H04N 5/2252; H04N 5/2257
USPC ....................................................... 439/76.1
See application file for complete search history.

(56) References Cited

FOREIGN PATENT DOCUMENTS

JP 2007-220511 A 8/2007

*Primary Examiner* — Abdullah Riyami
*Assistant Examiner* — Vladimir Imas
(74) *Attorney, Agent, or Firm* — Cermak Nakajima & McGowan LLP; Tomoko Nakajima (57) ABSTRACT

In an accommodation hole of a dielectric, an external connection terminal, a board connection terminal, and a first coil spring that make up an internal conductor are disposed compactly in a straight line along the hole axis of the accommodation hole. Therefore, an external connection connector can be reduced in size in the radial direction, the projected area on a second board can also be reduced, and it is possible to contribute to the reduction in size of the entire imaging device by the reduction in size of the second board.

8 Claims, 5 Drawing Sheets

ABSTRACT
ELECTRONIC COMPONENT AND IMAGING DEVICE

BACKGROUND OF THE INVENTION

1. Field of the Invention

The present invention relates to an electronic component, and more particularly to an electronic component for an imaging device such as an in-vehicle camera and an imaging device including the electronic component.

2. Description of the Related Art

An in-vehicle imaging device is used in a drive recorder of a vehicle and to improve visibility of behind a vehicle. This imaging device includes imaging components such as a board on which an imaging element such as a CMOS is mounted and a connector, and an imaging signal (electric signal) generated by the imaging element is output to an external device through a harness connected to the imaging device.

As such an imaging device, for example, Japanese Unexamined Patent Application Publication No. 2007-220511 (FIGS. 1 to 4) discloses an imaging device including an upper case 20, a lower case 30, a board 3 on which an imaging element is mounted, the imaging element being accommodated in the upper case 20 and the lower case 30, and a relay contact 50 having elastic contact pieces 52a and 52b that make elastic contact with an electric circuit pattern, a pad, or the like provided on the board 3. The elastic contact pieces 52a and 52b extend along the plate surface of the board 3, and the vicinities of the distal ends thereof are bent in a mountain shape toward the board 3, and contact portions 52c and 52d are provided at the apexes thereof.

According to such a conventional imaging device, by fitting together the upper case 20 and the lower case 30, the elastic contact pieces 52a and 52b of the relay contact 50 can be brought into conductive contact with the board 3. There is an advantage that even if the board 3 accommodated in the imaging device is slightly misaligned in the fitting direction of the upper case 20 and the lower case 30, since the elastic contact pieces 52a and 52b are bent in a mountain shape toward the board 3, the misalignment can be absorbed by the deformation thereof.

That is, when the board 3 is misaligned toward the relay contact 50, the mountain-shaped elastic contact pieces 52a and 52b are compressed and deformed to a large degree, so that the misalignment can be absorbed. On the other hand, when the board 3 is misaligned away from the relay contact 50, the elastic contact pieces 52a and 52b are compressed and deformed to a small degree, so that the misalignment can be absorbed.

However, in the conventional imaging device, since the elastic contact pieces 52a and 52b are bent in a mountain shape toward the board 3, in order to increase the capacity to absorb the misalignment of the board 3 in the fitting direction, it is necessary to increase the spring length of the elastic contact pieces 52a and 52b extending along the plate surface of the board 3. Then, the relay contact 50 having the elastic contact pieces 52a and 52b increases in size in the direction along the plate surface of the board 3, and there is a problem that it is difficult to reduce the size of the imaging device.

The present invention has been made on the background of the above conventional art. An object of the present invention is to reduce the size of an imaging device having a function of absorbing misalignment of a board.

SUMMARY OF THE INVENTION

To attain the above object, the present invention is realized by the following configuration.

According to the present invention, an electronic component includes a housing accommodating an imaging component including a board having a first contact portion and a second contact portion, and an external device connection portion conductively connecting the imaging component to an external device. The external device connection portion includes a first rod-shaped contact piece that conductively contacts the first contact portion, a conductive first elastic member that urges the first rod-shaped contact piece toward the first contact portion, a tubular dielectric having an accommodation hole accommodating the first rod-shaped contact piece and the first elastic member displaceably in the hole axis direction, and a tubular external conductor holding the outer periphery of the dielectric.

The present invention includes a first rod-shaped contact piece that conductively contacts the first contact portion, and a conductive first elastic member that urges the first rod-shaped contact piece toward the first contact portion. These are accommodated in an accommodation hole of a tubular dielectric displaceably in the hole axis direction. Therefore, compared with the relay contact of the conventional art in which the elastic contact pieces extend along the plate surface of the board, the vicinities of the distal ends thereof are bent into a mountain shape toward the board, and contact portions are provided at the apexes of the mountain shapes, the external device connection portion of the present invention can be reduced in size in the plate surface direction of the board (the direction intersecting the hole axis direction), and the projected area on the board to be conductively connected can be reduced. Therefore, it is possible to contribute to the reduction in size of the entire imaging device by the reduction in size of the board.

Since the first rod-shaped contact piece is urged by the first elastic member accommodated in the accommodation hole, the first rod-shaped contact piece can conductively contact the first contact portion at an appropriate contact pressure, and even if the attachment position of the board is misaligned with respect to the first rod-shaped contact piece in the hole axis direction, the misalignment can be absorbed by the displacement of the first rod-shaped contact piece due to the elastic deformation of the first elastic member.

Further, since the first elastic member is displaceably accommodated in the accommodation hole, the external device connection portion can be reduced in size also in this respect.

The external device connection portion of the present invention may further include a second rod-shaped contact piece that is disposed coaxially with the first rod-shaped contact piece and conductively contacts the external device through the first elastic member. According to the present invention, since the second rod-shaped contact piece is disposed coaxially with the first rod-shaped contact piece and conductively contacts the external device through the first elastic member, the size of the external device connection portion can be reduced also on the conductive contact side with the external device, and it is possible to contribute to the reduction in size of the entire imaging device.

The first elastic member of the present invention may be configured as a coil spring. According to this, it is possible to constantly urge the first rod-shaped contact piece without fail, and by disposing it concentrically with the first rod-shaped contact piece, it can be accommodated compactly in the accommodation hole of the dielectric, and it is possible to contribute to the reduction in size of the external device connection portion.

The external device connection portion of the present invention may further include a tubular contact piece that is disposed on the outside of the external conductor concentrically therewith and conductively contacts the external conductor and the second contact portion, and a second elastic member that urges the tubular contact piece toward the second contact portion. According to this, the mechanical structure for conductively connecting the external conductor to the second contact portion on the board can be compactly formed by the tubular contact piece disposed on the outside of the external conductor concentrically therewith. In addition, since the external device connection portion of the present invention includes a second elastic member that urges the tubular contact piece toward the second contact portion, the tubular contact piece can conductively contact the second contact portion at an appropriate contact pressure, and even if the attachment position of the board is misaligned with respect to the tubular contact piece in the tube axis direction, the misalignment can be absorbed by the displacement of the tubular contact piece due to the elastic deformation of the second elastic member.

The second elastic member of the present invention may be configured as a coil spring. According to this, it is possible to constantly urge the tubular contact piece without fail, and by disposing it concentrically with the tubular contact piece, it can be disposed compactly on the outside of the external conductor, and it is possible to contribute to the reduction in size of the external device connection portion.

The present invention may further include the imaging component including the board having the first contact portion and the second contact portion in an internal space of the housing. A movable gap in which the board can move in its plate surface direction may be provided between the housing and the board, and the first contact portion may be formed to be larger than the length of the movable gap. According to this, the board can be displaced within the movable gap. Even if the board is displaced and misaligned, since the first contact portion is larger than the length of the movable gap, the first rod-shaped contact piece can conductively contact the first contact portion without fail.

The second contact portion of the present invention may be formed to be larger than the length of the movable gap. According to this, even if the board is displaced and misaligned, since the second contact portion is larger than the length of the movable gap, the tubular contact piece can conductively contact the second contact portion without fail.

To further attain the above object, the present invention provides an imaging device including the electronic component according to the present invention. According to this, even if the board accommodated in the imaging device is misaligned, it is possible to conductively connect to the board without fail, and it is possible to make the imaging device small.

According to the electronic component and the imaging device of the present invention, the external device connection portion can be reduced in size in the plate surface direction of the board compared with the conventional art, and the projected area on the board to be conductively connected can be reduced. Therefore, the entire imaging device can be reduced in size by the reduction in size of the board. In addition, even if the attachment position of the board is misaligned in the direction intersecting the plate surface direction, since the first rod-shaped contact piece is urged and displaced by the first elastic member, the misalignment can be absorbed.

DESCRIPTION OF THE PREFERRED EMBODIMENTS

Figure 1:
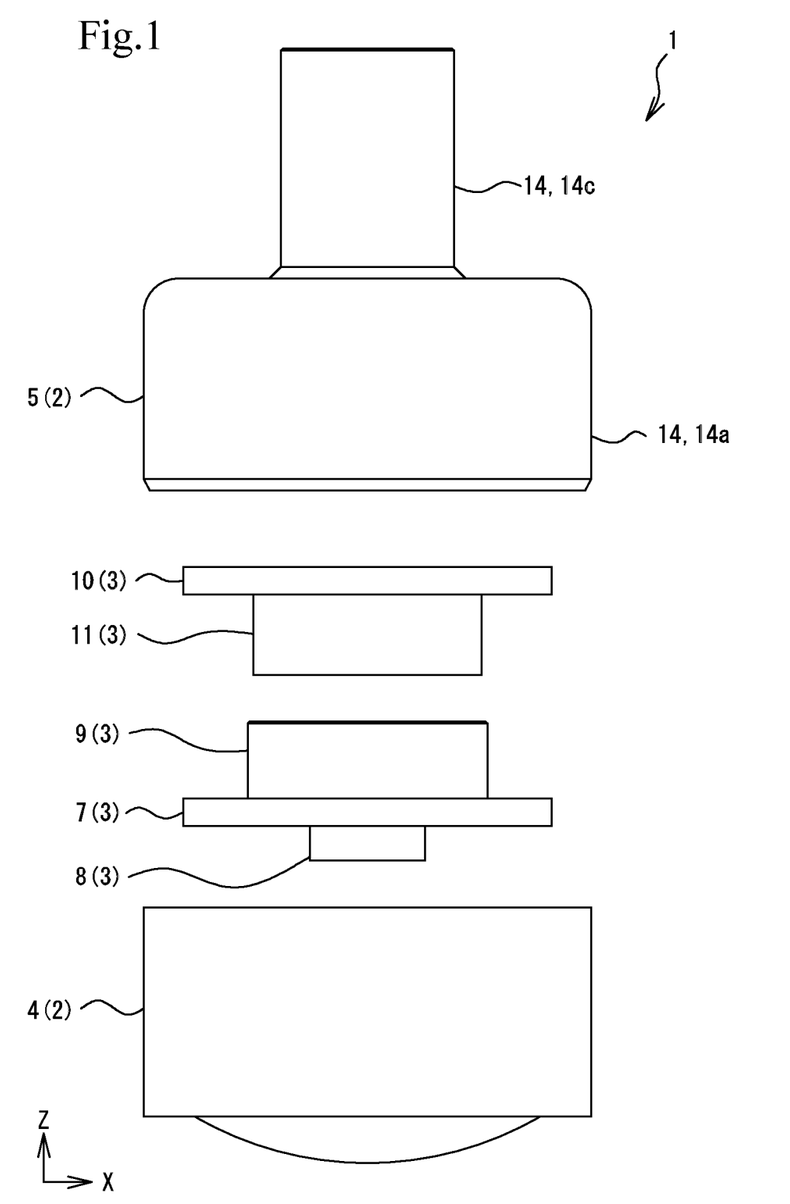
FIG. 1 is an exploded view of an imaging device according to an embodiment.

Hereinafter, an embodiment of the present invention will be described with reference to the drawings. In this specification, the claims, and the drawings, the X direction shown in FIG. 1 is the left-right direction, the Y direction perpendicular to the paper surface is the front-rear direction, and the Z direction is the optical axis direction and the height direction of the imaging device. However, such specifying of left-right, front-rear, and up-down does not limit the mounting direction or use direction of the electronic component or the imaging device of the present invention.

As schematically shown in FIG. 1, the imaging device 1 includes a housing 2 and an imaging component 3.

The housing 2 includes a front housing 4 and a rear housing 5, and an imaging component 3 is accommodated in the internal space 6 thereof. The imaging component 3 exemplified in this embodiment includes an imaging element 8 and an inter-board connection connector 9 mounted on a first board 7, and an inter-board connection connector 11 mounted on a second board 10. On the first board 7 and the second board 10, circuit wiring of a signal processing system (not shown) and various elements are mounted, and these are conductively connected by the inter-board connection connectors 9 and 11. On the board surface of the second board 10 opposite to the surface on which the inter-board connection connector 11 is mounted, there are formed a first circuit contact 12a as a "first contact portion" and a second circuit contact 12b as a "second contact portion" that are connected to a board circuit (not shown). The first circuit contact 12a and the second circuit contact 12b are conductively connected to an external connection connector 13 as an "external device connection portion" provided in the rear housing 5.

The external connection connector 13 is fitted and connected to a harness component (not shown), and the harness component is connected to an external device. The imaging signal generated by the imaging component 3 of the imaging device 1 is transmitted from the external connection connector 13 of the rear housing 5 through the harness component to the external device. The characteristics of the imaging device 1 having the schematic configuration described above reside in the rear housing 5 integrally provided with the external connection connector 13, so the characteristics thereof will be described in further detail.

Rear Housing 5

The rear housing 5 has a case portion 14 and the above-described external connection connector 13.

The case portion 14 has a tubular peripheral wall 14a having a square tubular shape, a wall portion 14b formed at one end of the tubular peripheral wall 14a, and a fitting portion 14c protruding in a tubular shape from the wall portion 14b. The case portion 14 of this embodiment is manufactured by die casting of aluminum alloy. Die casting can mass-produce die-cast bodies quickly with high dimensional accuracy, and can manufacture the case portion 14 having high quality with high production efficiency.

The front housing 4, which is manufactured by die casting of aluminum alloy as with the rear housing 5, is attached to the opening end 14d formed at the other end of the tubular peripheral wall 14a (FIG. 1). Inside the fitting portion 14c, there is formed a fitting chamber 14c1 into which a harness component (not shown) is inserted and fitted and connected. Inside the fitting portion 14c, there is formed a partition wall 14e that separates the fitting chamber 14c1 from the internal space 6 inside the tubular peripheral wall 14a. An attachment hole 14e1 for holding the external connection connector 13 by press fitting is formed in the partition wall 14e. A recessed portion 14f is formed on the internal space 6 side of the partition wall 14e. A seal portion 15 that is, for example, an O-ring is formed in the recessed portion 14f. The fitting chamber 14c1 and the internal space 6 are liquid-tight sealed from each other. Instead of the O-ring, the seal portion 15 may be formed of a cured body of a liquid or gel-like potting agent. The seal portion 15 is formed only between the inside of the recessed portion 14f and the external connection connector 13, and is not formed on the other inner surface of the wall portion 14b, and the region where the seal portion 15 is formed is made small. Therefore, the area of the wall portion 14b can be reduced as compared with the configuration in which the seal portion is provided on the inner surface of the wall portion 14b, and the case portion 14 can be reduced in size in the XY direction.

The external connection connector 13 includes a shield member 16 as an "external conductor", a dielectric 17, and an internal conductor 18 disposed in an accommodation hole 17a along the central axis of the dielectric 17. The internal conductor 18 includes an external connection terminal 19 as a "second rod-shaped contact piece," a board connection terminal 20 as a "first rod-shaped contact piece," a first coil spring 21 as a "first elastic member", a tubular contact piece 22, and a second coil spring 23 as a "second elastic member."

The shield member 16 is formed of a cylindrical metal material. In the shield member 16, a cylindrical tubular portion 16a is formed. On the outer peripheral surface of the tubular portion 16a, there is formed an annular protrusion 16b that is fitted in the recessed portion 14f of the above-described partition wall 14e. By fitting the annular protrusion 16b into the recessed portion 14f, an annular retaining engagement portion 16c protruding outward is formed at the internal space 6 side end of the tubular portion 16a of the O-ring. The length of the shield member 16 along the Z direction is a length that can cover the entire length of the internal conductor 18 in a state where the board connection terminal 20 is retracted into the accommodation hole 17a of the dielectric 17, so that the electromagnetic wave shielding effect can be exerted over the entire length of the internal conductor 18.

A cylindrical dielectric 17 is disposed inside the tubular portion 16a. A fitting chamber 17b into which a harness component (not shown) is inserted and fitted is formed in the dielectric 17. Inside the fitting chamber 17b, a contact piece 19a of the above-described external connection terminal 19 is disposed so as to protrude.

The internal conductor 18 is disposed in the accommodation hole 17a of the dielectric 17. That is, a holding portion 17c for holding the base portion 19b of the external connection terminal 19 by press fitting is formed at the fitting chamber 17b side end of the accommodation hole 17a, and the external connection terminal 19 is fixed thereto.

A guide protrusion 19c that protrudes from the base portion 19b to the inside of the accommodation hole 17a and that has a smaller diameter than the base portion 19b is formed in the external connection terminal 19. This has a function of holding one end of the first coil spring 21 and guiding its expansion and contraction deformation.

One end of the first coil spring 21 is in contact with the shoulder portion 19d of the base portion 19b, and the other end is in contact with a shoulder portion 20d1 (described later) of the board connection terminal 20. Therefore, the first coil spring 21 constantly urges the board connection terminal 20 in a direction in which the board connection terminal 20 moves away from the external connection terminal 19 in the hole axis direction of the accommodation hole 17a (Z direction).

The board connection terminal 20 has a contact piece 20a that conductively contacts the first circuit contact 12a of the second board 10, a base portion 20b, and a guide protrusion 20c having a smaller diameter than the base portion 20b. The base portion 20b is guided by the inner peripheral surface of the accommodation hole 17a when the board connection terminal 20 is displaced. In the base portion 20b, there is formed a shoulder portion 20d1 with which the other end of the first coil spring 21 is in contact and that is constantly urged. At the end of the accommodation hole 17a of the dielectric 17, there is formed a retaining wall 17d protruding annularly in the hole axis direction. A shoulder portion 20d2 of the base portion 20b urged by the first coil spring 21 comes into contact with the retaining wall 17d, and the board connection terminal 20 is thereby prevented from coming off. An insertion hole 17e is formed in the retaining wall 17d so that the displacement of the contact piece 20a of the board connection terminal 20 is guided.

Figure 2:
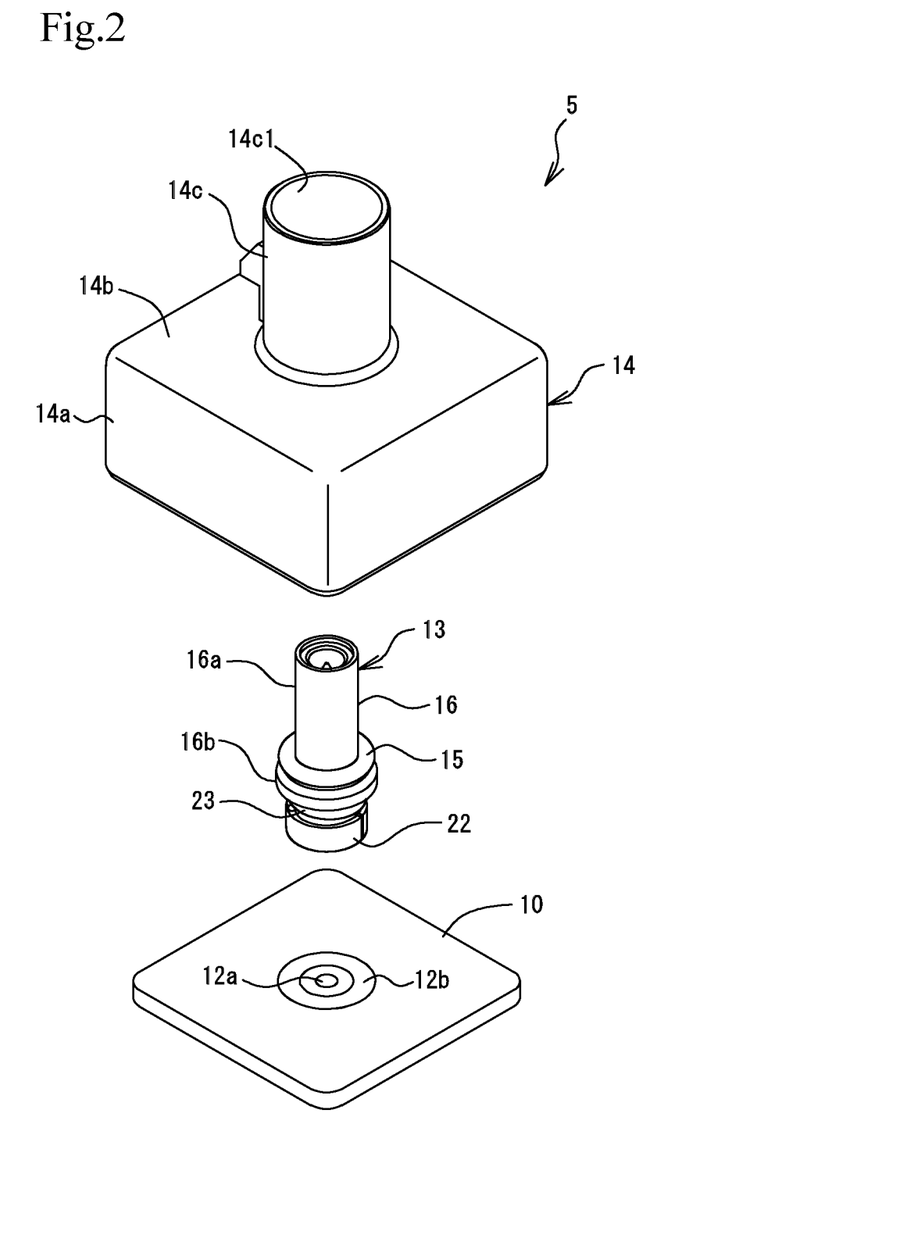
FIG. 2 is an exterior perspective view of the rear housing, the external device connection portion, and the board shown in FIG. 1.
Figure 5:
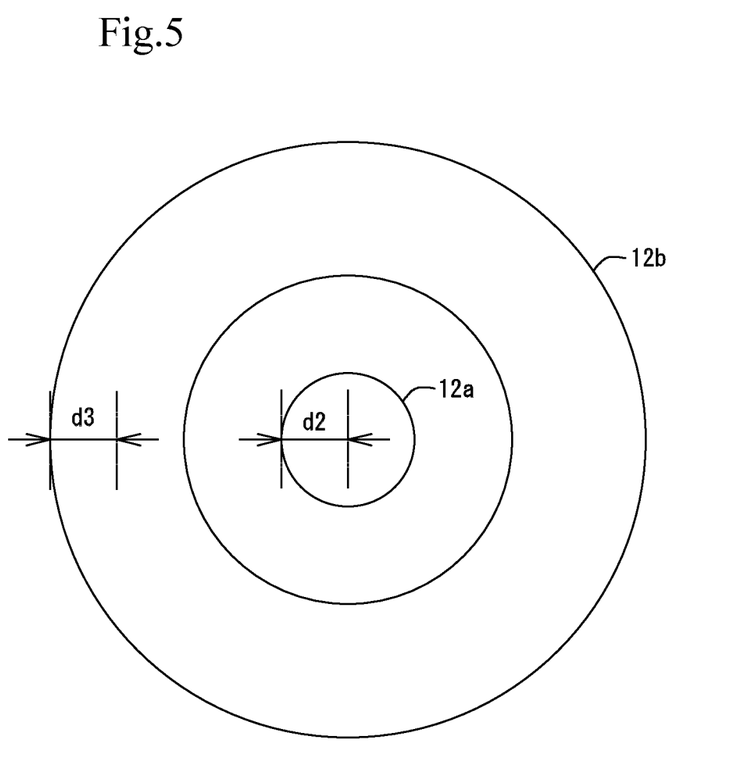
FIG. 5 is an enlarged plan view showing a first contact portion and a second contact portion of the board shown in FIG. 2.

The contact piece 20a of the board connection terminal 20 described above conductively contacts the first circuit contact 12a of the second board 10. The first circuit contact 12a is formed as a circular electrode as shown in FIGS. 2 and 5, and is connected to a signal line of a board circuit (not shown) formed on the second board 10.

The tubular contact piece 22 is made of metal and has an annular shape with ends and is attached to the outer periphery of the end portion of the shield member 16 protruding into the internal space 6 of the rear housing 5. At one end of the tubular contact piece 22, a sliding contact 22a protruding inward is formed. When the tubular contact piece 22 is displaced, its sliding contact 22a conductively contacts the outer peripheral surface of the shield member 16 while sliding thereon. Therefore, the tubular contact piece 22 is electrically connected to the shield member 16, and a shielding effect against electromagnetic wave noise similar to that of the shield member 16 can be exerted. The sliding contact 22a is engaged with the retaining engagement portion 16c of the shield member 16 so as to prevent the tubular contact piece 22 from coming off.

An annular contact 22b is formed at the second board 10 side end of the tubular contact piece 22. The annular contact 22b conductively contacts the second circuit contact 12b of the second board 10. As shown in FIGS. 2 and 5, the second circuit contact 12b is formed as an annular electrode and is connected to a ground line of a board circuit (not shown) formed on the second board 10, and exerts electromagnetic wave shielding by the shield member 16 and the tubular contact piece 22.

The second coil spring 23 has a function of constantly urging the tubular contact piece 22 toward the second board 10. That is, one end of the second coil spring 23 is in contact with the annular protrusion 16b of the shield member 16, and the other end is in contact with the sliding contact 22a side end of the tubular contact piece 22. The second coil spring 23 can be formed of a conductive metal. In that case, the tubular contact piece 22 conductively contacts the shield member 16 at the sliding contact 22a, and the second coil spring 23 can also conductively contact the shield member 16. Therefore, conductive contact can be ensured.

Method of Assembling Imaging Device

The imaging device 1 is assembled by fitting and sealing the end portions of the front housing 4 and the rear housing 5 in a state in which the imaging component 3 is accommodated in the internal space 6 of the front housing 4 and the rear housing 5. In this assembled state, the contact piece 20a of the board connection terminal 20 of the above-described external connection connector 13 is pressed into contact with the first circuit contact 12a by the urging force of the first coil spring 21, and the annular contact 22b of the tubular contact piece 22 is pressed into contact with the second circuit contact 12b by the urging force of the second coil spring 23. As a result, the external connection connector 13 is conductively connected to the board circuit of the second board 10.

Operation and Effect of Embodiment

Next, the operation and effect of the imaging apparatus 1 of this embodiment will be described.

The internal conductor 18 is accommodated in the accommodation hole 17a of the dielectric 17 so as to be displaceable in the hole axis direction. More specifically, the outside diameters of the external connection terminal 19, the board connection terminal 20, and the first coil spring 21 that make up the internal conductor 18 are formed to be smaller than the inside diameter of the accommodation hole 17a, and the external connection terminal 19, the board connection terminal 20, and the first coil spring 21 are disposed compactly in a straight line along the hole axis direction of the accommodation hole 17a. Therefore, compared with the relay contact of the conventional art in which the elastic contact pieces extend along the plate surface of the board, the vicinities of the distal ends thereof are bent into a mountain shape toward the board, and contact portions are provided at the apexes of the mountain shapes, the external connection connector 13 can be reduced in size in the radial direction (X direction and Y direction) while the board connection terminal 20 can be displaced in the direction of the hole axis, and the projected area on the second board 10 can also be reduced. Therefore, it is possible to contribute to the reduction in size of the entire imaging device 1 by the reduction in size of the second board 10.

Since the board connection terminal 20 and the tubular contact piece 22 are constantly urged by the first coil spring 21 and the second coil spring 23, respectively, the board connection terminal 20 and the tubular contact piece 22 can conductively contact the first circuit contact 12a and the second circuit contact 12b at an appropriate contact pressure. Even if the attachment position of the second board 10 is misaligned in the hole axis direction (Z direction), for example, during assembling of the imaging device 1, the misalignment can be absorbed by the displacement of the board connection terminal 20 and the tubular contact piece 22 due to the elastic deformation of the first coil spring 21 and the second coil spring 23.

Figure 4:
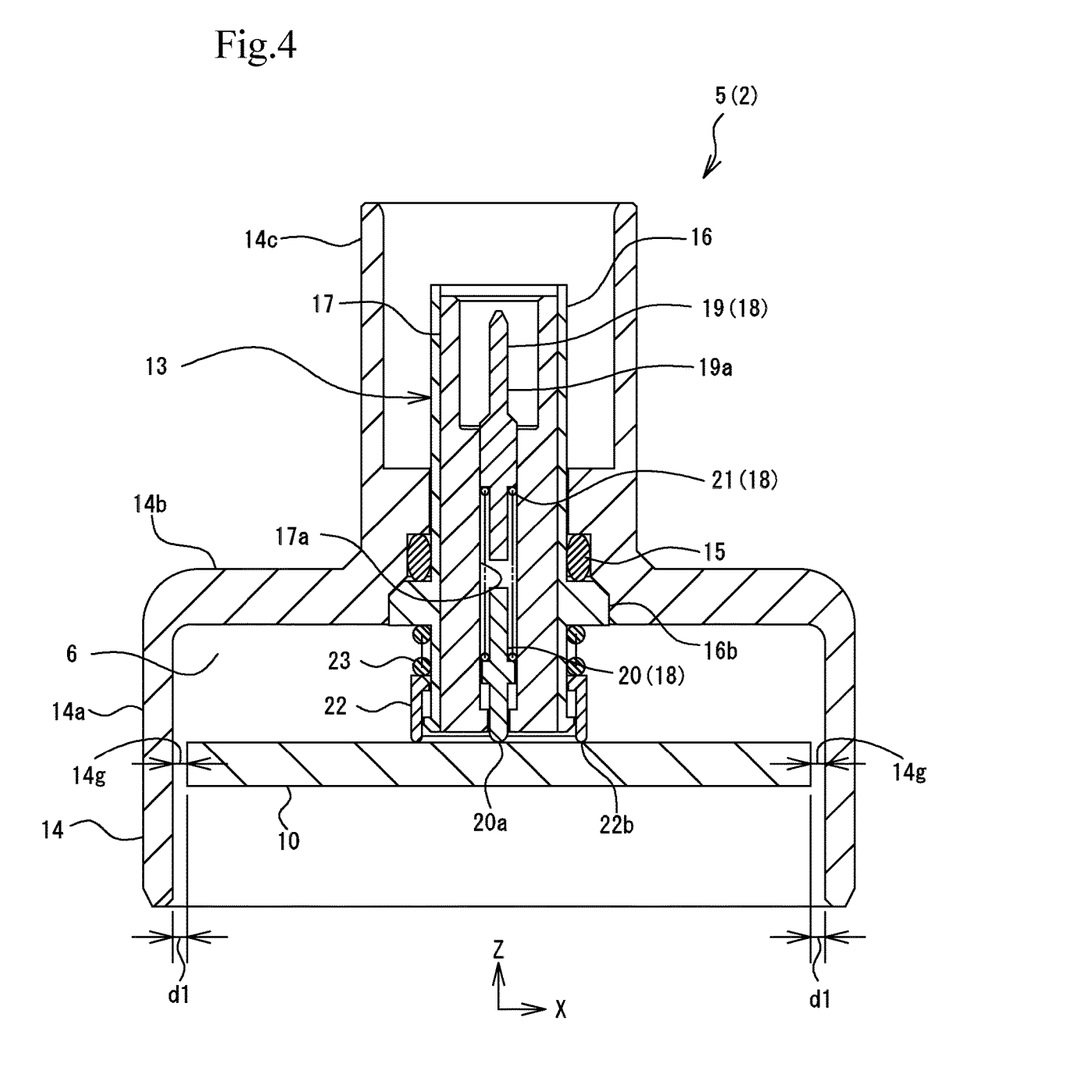
FIG. 4 is a sectional view showing a conductive connection state between the external device connection portion and the board of FIG. 2.

As shown in FIG. 4, there is a movable gap 14g between the plate edge of the second board 10 and the tubular peripheral wall 14a of the case portion 14. The second board 10 is movable within the movable gap 14g in the X direction and the Y direction. Therefore, even if the second board 10 is misaligned in the X direction and the Y direction due to reasons of manufacturing and assembling of the housing 2 and the imaging component 3 composed of a plurality of parts, since the second board 10 moves within the movable gap 14g, the second board 10 can be installed without interfering with the inner peripheral surface of the tubular peripheral wall 14a.

The length d1 of the movable gap 14g is set to be shorter than the radius d2 of the circular first circuit contact 12a and the width d3 of the half of the annular second circuit contact 12b of the second board 10 shown in FIG. 5. In other words, the radius d2 of the first circuit contact 12a and the width d3 of the half of the second circuit contact 12b of the second board 10 are formed to be longer than the length d1 of the movable gap 14g. Therefore, even if the second board 10 is misaligned toward the inner peripheral surface of the tubular peripheral wall 14a at the time of assembling the imaging device 1, the contact piece 20a of the board connection terminal 20 can conductively contact the first circuit contact 12a, and the tubular contact piece 22 can conductively contact the second circuit contact 12b.

Since the front housing 4 and the rear housing 5 are made of metal, the heat remaining inside the housing 2 can be effectively radiated to the outside, and the shield member 16 made of metal is effective for electromagnetic wave shielding of the internal conductor 18. Further, since the rear housing 5 is made of metal, not only the electromagnetic wave shielding effect on the internal conductor 18 by the shield member 16 but also the electromagnetic wave shielding effect on the internal conductor 18 by the rear housing 5 can be exerted. In addition, the rear housing 5 can exert a shielding effect so as to prevent electromagnetic wave noise due to the imaging component 3 disposed between the rear housing 5 and the shield member 16 from leaking outside the imaging device 1. Conversely, the rear housing 5 can also exert a shielding effect to prevent electromagnetic wave noise from entering the inside of the imaging device 1 from the outside. Therefore, it is possible to obtain the imaging device 1 which is preferable for high-quality high-speed transmission of the image signal (electric signal) by the imaging component 3.

In case in which there is no second coil spring 23 which urges the tubular contact piece 22, when the second board 10 moves away from the external connection connector 13 in the Z direction, and the second board 10 side end of the shield member 16 comes out of contact with the second board 10, the tubular contact piece 22 does not sometimes move due to following the second board 10. Then, the tubular contact piece 22 becomes unable to cover the distal end of the contact piece 20a of the board connection terminal 20 from the outside, and the shielding effect by the shield member 16 will be reduced. In contrast, in the above-described embodiment the tubular contact piece 22 is constantly urged by the second coil spring 23. Therefore, even though the second board 10 moves away from the external connection connector 13 in the Z direction, and the second board 10 side end of the shield member 16 comes out of contact with the second board 10, the annular contact point 22b can always come in contact with the second circuit contact 12b. Therefore, the tubular contact piece 22 can exert a shielding effect on the contact piece 20a.

Modifications of Embodiment

Since the above embodiment can be implemented in modifications, examples thereof will be described.

Figure 3:
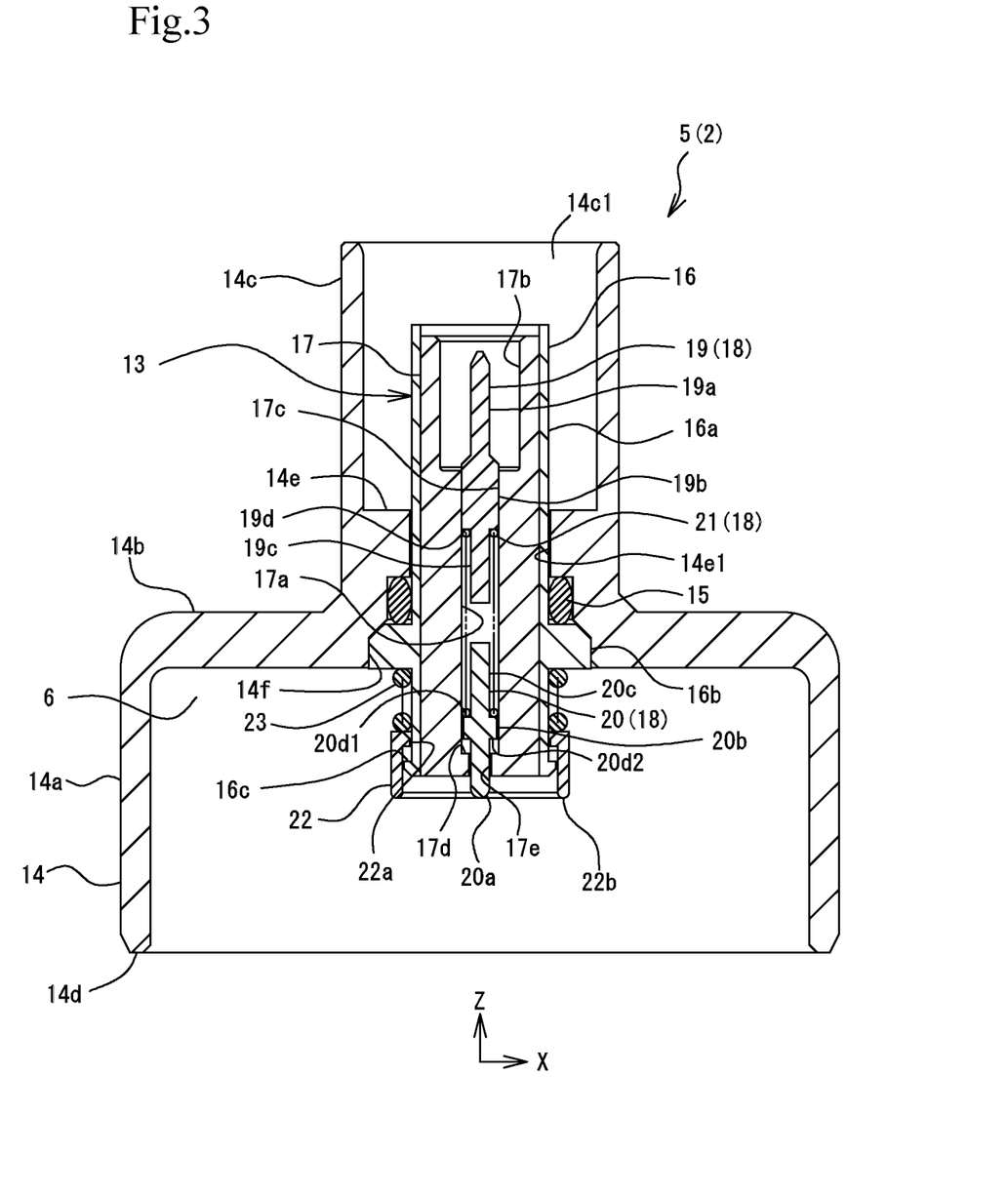
FIG. 3 is a central longitudinal sectional view of the rear housing shown in FIG. 1.

In the above embodiment, as shown in FIG. 3, an example in which the lower end position of the contact piece 20a of the board connection terminal 20 and the lower end position of the annular contact 22b of the tubular contact piece 22 are the same is shown, but either of them may protrude in the Z direction toward the second board 10 with respect to the other.

In the above embodiment, an example in which the board connection terminal 20 is urged by the first coil spring 21 is shown, but instead of the first coil spring 21, for example, a conductive rubber may be provided between the guide protrusion 19c of the external connection terminal 19 and the guide protrusion 20c of the board connection terminal 20. Even with such a conductive rubber, it is possible to urge the board connection terminal 20 while conductively connecting the external connection terminal 19 and the board connection terminal 20.

In the above embodiment, the housing 2 (the front housing 4 and the rear housing 5) is made of a metal, but it may be a molded body of a hard resin. Among molded bodies made of hard resin, it can be formed as a molded body of carbon fiber reinforced resin. The carbon fiber reinforced resin is obtained by dispersing carbon fibers having conductivity in thermoplastic resin or thermosetting resin. By using the carbon fiber reinforced resin, the housing 2 can have electromagnetic wave shielding performance, so that the electromagnetic wave shielding effect can be exerted by the entire housing 2.

What is claimed is:

1. An electronic component comprising:
   a housing accommodating an imaging component including a board having a first contact portion and a second contact portion; and
   an external device connection portion conductively connecting the imaging component to an external device, wherein the external device connection portion includes a first rod-shaped contact piece that conductively contacts the first contact portion, a conductive first elastic member that urges the first rod-shaped contact piece toward the first contact portion, a dielectric that is formed in a tubular shape and has an accommodation hole accommodating the first rod-shaped contact piece and the first elastic member displaceably in the hole axis direction, and an external conductor that is formed in a tubular shape and holds the outer periphery of the dielectric.

2. The electronic component according to claim 1, wherein the external device connection portion further includes a second rod-shaped contact piece that is disposed coaxially with the first rod-shaped contact piece and conductively contacts the external device through the first elastic member.

3. The electronic component according to claim 1, wherein the first elastic member is a coil spring.

4. The electronic component according to claim 1, wherein the external device connection portion further includes a tubular contact piece that is disposed on the outside of the external conductor concentrically and conductively contacts the external conductor and the second contact portion, and a second elastic member that urges the tubular contact piece toward the second contact portion.

5. The electronic component according to claim 4, wherein the second elastic member is a coil spring.

6. The electronic component according to claim 1, further comprising the imaging component including the board having the first contact portion and the second contact portion in an internal space of the housing, wherein a movable gap in which the board can move in its plate surface direction is provided between the housing and the board, and the first contact portion is formed to be larger than the length of the movable gap.

7. The electronic component according to claim 6, wherein the second contact portion is formed to be larger than the length of the movable gap.

8. An imaging device comprising the electronic component according to claim 1.

* * * * *